United States Patent [19]

Kato

[11] Patent Number: 4,507,797
[45] Date of Patent: Mar. 26, 1985

[54] DATA RECORDING SYSTEM USING STIMULABLE PHOSPHOR

[75] Inventor: Hisatoyo Kato, Ashigara, Japan

[73] Assignee: Fuji Photo Film Co., Ltd., Kanagawa, Japan

[21] Appl. No.: 434,327

[22] Filed: Oct. 14, 1982

[30] Foreign Application Priority Data

Oct. 26, 1981 [JP] Japan .................. 56-171185

[51] Int. Cl.$^3$ .............................................. A61B 6/00
[52] U.S. Cl. ...................................... 378/165; 378/166
[58] Field of Search ............... 378/165, 166, 62, 63, 378/98

[56] References Cited

U.S. PATENT DOCUMENTS 3,666,952  5/1972  McCready et al. .................. 378/165
4,356,398  10/1982  Komaki et al. ........................ 378/98

FOREIGN PATENT DOCUMENTS 799727  1/1981  U.S.S.R. ............................. 378/165

Primary Examiner—Alfred E. Smith
Assistant Examiner—T. N. Grigsby
Attorney, Agent, or Firm—Sughrue, Mion, Zinn, Macpeak and Seas

[57] ABSTRACT

A data recording system records data on a part of a radiation image storage panel using a stimulative phosphor by exposing that part to an X-ray beam generated by an X-ray beam generator. An input device is provided for entering into the system information associated with an image to be stored in the mentioned part of the radiation image storage panel. A control unit controls the X-ray beam generator in response to the entered information so that the intensity of the X-ray beam is varied and the X-ray beam is caused to scan the mentioned part of the radiation image storage panel. The information is thus recorded in the part of the panel and will be read out therefrom in the same way as a radiation image of an object stored in the remaining part of the panel.

11 Claims, 3 Drawing Figures

DATA RECORDING SYSTEM USING STIMULABLE PHOSPHOR

BACKGROUND OF THE INVENTION

1. Field of the Invention

The present invention relates to a data recording system and, more particularly, to a data recording system applicable to a radiation image recording process in which a radiation image storage medium, e.g. a panel having a stimulable phosphor layer is exposed to a radiation transmitted through an object to store therein a latent image associated with the object and, afterwards, it is exposed to stimulating rays to read out the stored latent image.

2. Description of the Prior Art

Radiation image recording systems of the type described are known to the art (as disclosed in U.S. Pat. No. 3,859,527). When numerous radiation image storage panels of stimulable phosphor should be handled at the same time as often occurs before or after radiation exposure, how to identify the individual radiation image storage panels is the critical problem. Such a problem becomes particularly severe when exposed panels from different exposing rooms or locations must be managed for image processing concentratively at a processing center.

For the management of the radiation image storage panels and reproduction of the stored images, it is usually required to supply various kinds of information such as characteristic data of objects as typified by patients' names, radiation exposure data including the dates of exposure and the amounts of radiation or the exposed parts of objects, and image characteristic data as exemplified by distributions of stored radiation amounts. There has been proposed a method in which characteristic or specific identification codes are assigned to individual radiation image storage panels so that they can be compared with the data recorded on a sheet or stored in a computer for the purpose of image processing, for example. However, it is extremely time consuming to identify the codes of numerous panels and search for their matching data. According to another known method, a magnetic recording medium or a label containing a photochromic material may be fit to each radiation image storage panel or a cassette containing it so as to carry information thereon (see U.S. patent application Ser. No. 168,803, for example). This method, however, differs in principle from the storage of a radiation image in a stimulable phosphor and, accordingly, some additional data reading apparatus with a physical, chemical, electrical or mechanical operating principle is required in order that such data may be read out at a processing center simultaneously with the reproduction of radiation images of objects.

SUMMARY OF THE INVENTION

A data recording system embodying the present invention is of the type in which a radiation image storage medium including a stimulable phosphor is exposed to a radiation transmitted through an object to store therein a latent image associated with the object, the medium being, afterwards, exposed to a stimulating ray to read out the stored latent image. The system includes X-ray beam generator means for generating X-ray beams to an irradiative part of the radiation image storage medium. Input means is provided for receiving information associated with an image to be recorded in the mentioned part of the radiation image storage medium. Control means controls the X-ray beam generator means in conformity with the entered information. The control means varies the intensity of the X-ray beam in accordance with the entered information and causes the X-ray beam to be directed to the mentioned part of the radiation image storage medium, thereby recording the information in that part of the radiation image storage medium.

It is accordingly, an object of the present invention to provide a data recording system which eliminates the drawbacks inherent in the prior art systems and permits various kinds of information to be read out in the same way as a latent image of a radiation image stored in a radiation image storage panel, which uses a stimulable phosphor.

It is another object of the present invention to provide a generally improved data recording system using a stimulable phosphor.

Preferably, a stimulable phosphor applicable to the present invention emits light having a wavelength within the range of 300 to 500 nm in response to stimulating rays having a wavelength within the range of 600 to 700 nm, as disclosed in U.S. Pat. No. 4,258,264. One example of this phosphor is rare earth activated alkaline earth metal fluorohalide phosphor, as described in Japanese Patent Laid-Open Publication No. 12143/1980, a phosphor represented by the formula $(Ba_{1-x-y}, Mg_x, Ca_y)FX:aEu^2$ wherein X is at least one of Cl and Br, x and y are numbers satisfying $0 < x+y \leq 0.6$ and $sy \neq 0$, and a is a number satisfying $10^{-6} \leq a \leq 5 \times 10^{-2}$. Another example of this phosphor is, as described in U.S. Pat. No. 4,239,968, a phosphor represented by the formula $(Ba_{1-x}, M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$. Further, as the stimulable phosphor to be used in the present invention can be used ZnS:Cu,Pb; $BaO \cdot xAl_2O_3:Eu$ wherein $0.8 \leq x \leq 10$: and $M^{II}O \cdot xSiO_2:A$ wherein $M^{II}$ is Mg, Ca, Sr, Zn, Cd or Ba, A is Ce, Tb, Eu, Tm, Pb, Tl, Bi or Mn, and x is a number satisfying $0.5 \leq x \leq 2.5$, as described U.S. Pat. No. 4,236,078. Furthermore, as the stimulable phosphor can be used LnOX:xA wherein Ln is at least one of La, Y, Gd and Lu, X is at least one of Cl and Br, A is at least one of Ce and Tb, x is a number satisfying $0 < x < 0.1$, as described in U.S. Pat. No. 4,236,078. Among the above numerated phosphors, the rare earth activated alkaline earth metal fluorohalide phosphor is the most preferable, among which barium fluorohalides are the most preferable in view of the high intensity of emission of light.

For higher intensity of emission of light, use may be made of barium fluorohalides with the addition of metal fluorides as described in Japanese Patent Laid-Open Publication Nos. 2385/1981 and 2386/1981, or those with the addition of at least one of metal chlorides, metal bromides and metal iodides, as disclosed in U.S. patent application Ser. No. 367,665.

Further, it is desirable to color the phosphor layer of the stimulable phosphor plate including the above phosphor by use of pigments or dyes to improve the sharpness of the image obtained thereby, as disclosed in U.S. patent application Ser. No. 156,520.

In the present invention, the stimulable phosphor may be defined as a phosphor which, after exposure to an initial radiation like X-rays, α-rays, β-rays, γ-rays and ultraviolet rays, emits light of the amount associated with the energy of the stored radiation when stimulated optically.

BRIEF DESCRIPTION OF THE DRAWINGS

The objects and features of this invention will become more apparent from a consideration of the following detailed description and the drawings in which.

DESCRIPTION OF THE PREFERRED EMBODIMENT

Figure 1:
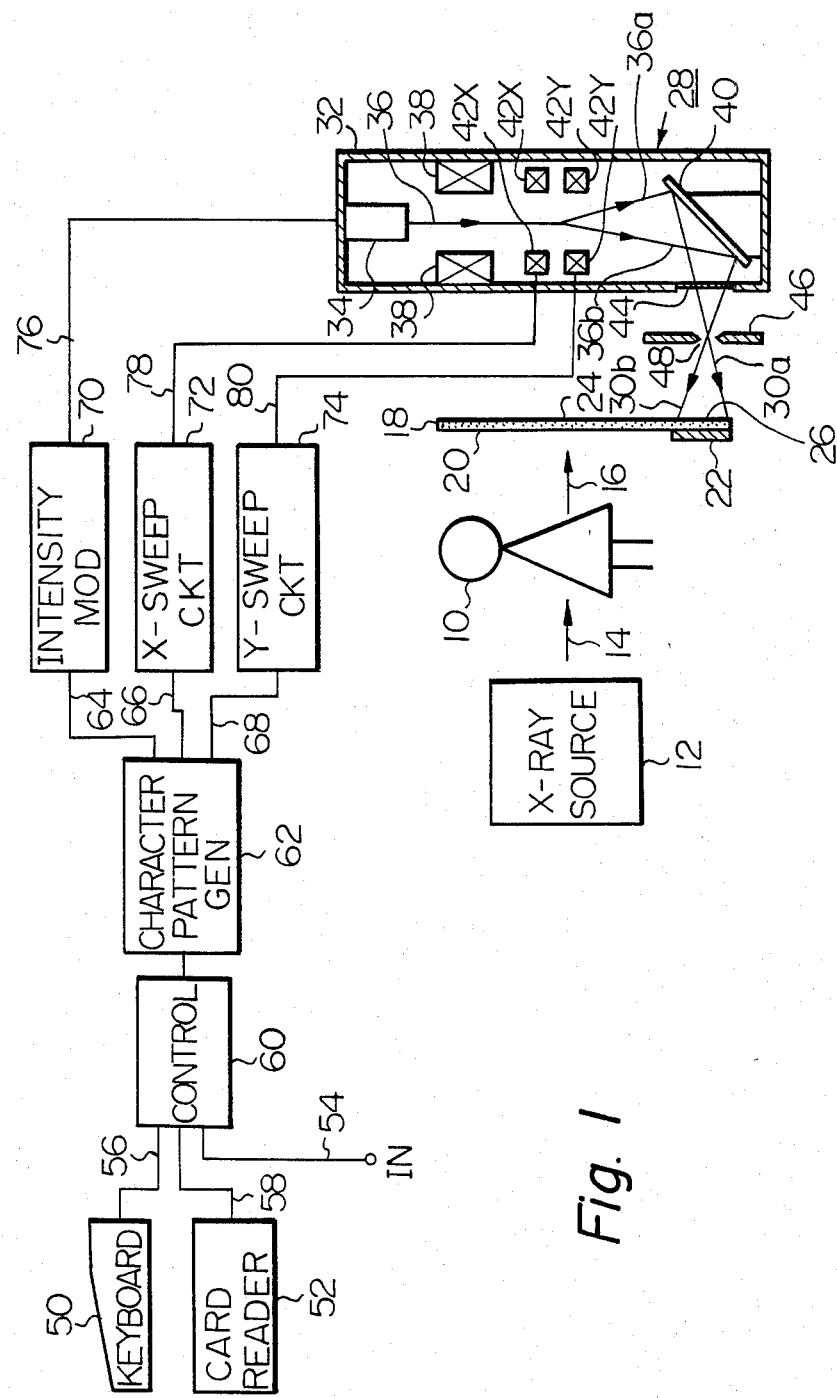
FIG. 1 is a schematic block diagram showing a data recording system using a stimulable phosphor in accordance with the present invention.
Figure 2:
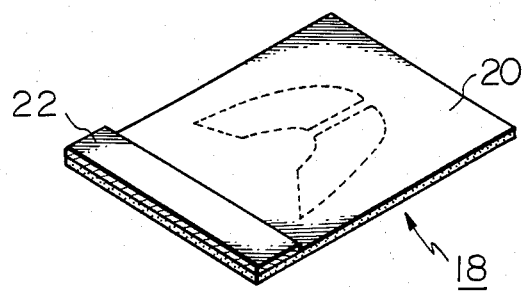
FIGS. 2 and 3 are perspective views of examples of a radiation image storage panel used in conjunction with the system illustrated in FIG. 1.

Referring to FIG. 1, of the drawings, the data recording system includes an X-ray source 12 for emitting X-rays 14 to which a human or living body, or like object 10 is exposed. The X-rays transmitted through the human body 10, designated by the reference numeral 16 and sometimes referred to as an imagewise radiation, impinges on a radiation image storage panel or sheet 18 so that the X-ray transmission image of the human body 10 is recorded therein. As shown in FIG. 2, the radiation image storage panel 18 in this embodiment carries a shield layer 22 in lower part of its one surface 20. The shield layer 22 including a material which does not transmit X rays shields the lower part of the surface 20 from the X-rays 14 from the source 12 or the X-rays 16 from the human body 10.

Generally designated by the reference numeral 28 is an X-ray microbeam generation unit which emits an X-ray microbeam 30a–30b toward that part of the other surface 24 of the radiation image storage panel 18 which corresponds to the shield layer 22 on the surface 20. The X-ray microbeam generation unit 28 comprises a vacuous container 32 in which an electron gun 34 is fixed in position. An electron beam 36 emitted from the electron gun 34 is passed through a converging electromagnetic lens or winding 38 to form a smaller diameter beam. The electrons impinge on a target 40 fixed to the container 32 for thereby generating an X-ray. In this instance, the electron beam 36 is deflected by an X-deflection winding 42X and a Y-deflection winding 42Y. Supposing that the direction perpendicular to the sheet surface of FIG. 1 is the direction X and the vertical direction in FIG. 1 is the direction Y, for example, the electron beam 36 can sweep over the range from the beam position 36a to the beam position 36b if the drive voltage supplied to the Y-deflection winding 42Y is varied. The X-ray generated at the target 40 is passed through an aperture 44 in the container 32 and then a pinhole lens 48 in an X-ray shield plate 46, irradiating the area 26 of the radiation image storage panel 18 as an X-ray microbeam 30a–30b. The X-ray microbeam will of course sweep the area 30a–30b in the direction X perpendicular to the sheet surface of FIG. 1 when the voltage applied across the X-deflection winding 42X is varied in a known manner.

The limited part 26 of the radiation image storage panel 18 is adapted to carry various kinds of information such as characteristic or specific data of the object 10, exposure data required for setting image processing conditions in an image processing step which will follow the exposure of the panel 18, and/or imaging data associated with the image stored in the panel 18. The object data may include the name (or chart number or like code), sex, date of birth and others particular to a patient. The exposure data may include the date (time) of exposure, the place of exposure (code of an exposure room or location, or of an exposure unit), the code of a person in charge, the number of radiation image storage panels 18 used, management and statistic data, various exposure conditions such as X-ray tube voltage/current, X-ray radiation time and distance between the X-ray tube and a panel 18, the image processing conditions such as frequency and tone processings of the image, the exposed object's part as typified by the chest or abdomen, and the exposing method such as with or without a contrast medium. Further, the imaging data include information on the radiation exposure conditions such as a distribution of stored radiation amounts in the panel 18.

Such object data and/or radiation exposure data are recorded in the information recording area 26 on the panel 18 when required by the subsequent image processing or management of the panel 18. In order to enter these data, the system of the present invention employs a key-board 50 and a card reader 52. The keyboard 50 is adapted for manual input of the object data and exposure data, and, for this purpose, it has alphanumeric keys or like character keys together with function keys. The card reader 52 may comprise a magnetic card reading unit, for example, which receives object's data carried on a magnetic card for identifying the patient 10. In addition to or in place of such data input apparatus, use may be made of a bar code reader, an optical character reader (OCR), a mark sheet reader, a pen scanner and/or a pen-touch input device so as to input the various kinds of information into the system by reading them either optically or mechanically from an identification card or a patient's chart.

Part of the radiation exposure data such as the X-ray tube voltage/current, radiation time, data (time) of exposure, code of a used exposure unit and the number of used panels 18 may be supplied to an input port which is symbolized by input terminal IN and connected to a lead 54. Then, the input terminal IN may be connected with output terminals of a control unit (not shown) for the X-ray source 12 which deliver such data. These data may include imaging data, e.g. a distribution of stored radiation amounts in the panel 18. The image data is obtainable, for example, by providing a sensor responsive to an X-ray radiation amount (not shown) in the vicinity of the surface 24 of the panel 18 to supply its output to the input terminal IN, as disclosed in U.S. patent application Ser. No. 168,803. Alternatively, the distribution of stored radiation amounts and other image data may be provided by reading them out before reading out and reproducing a stored image, as described in Japanese Patent Application Nos. 165111/1981, 165112/1981 and 165113/1981 filed Oct. 16, 1981. Furthermore, the input terminal IN may be interconnected to a data receiving apparatus (not shown) for receiving data from a processing center where radiation image storage panels 18 are concentratively managed for image processing. Then, the data from the center such as identification codes assigned to individual panels 18 may be received and recorded in the region 26 of each panel 18.

The keyboard 50 and card reader 52 are connected to a control unit 60 by leads 56 and 58, respectively. The control unit 60 functions to temporarily store the data received on the leads 54, 56 and 58 and, also, to perform various controls over the entire system such as the timing control. The control 60 connects to a character pattern generation circuit 62 which is adapted to generate a signal representative of a display pattern of a selected character, including a letter and a figure, under the control of the control unit 60. Outputs 64, 66 and 68 of the character pattern generator 62 are coupled respectively to an intensity modulation circuit 70, an X-sweep circuit 72 and a Y-sweep circuit 74. The intensity modulator 70 has an output 76 connected to the electron gun 34 so that the voltage applied to the electron gun 34 is controlled in response to a character pattern signal generated by the character pattern generator 62, thereby varying the intensity of the electron beam 36. The output 78 of the X-sweep circuit 72 is connected to the X-deflection winding 42 and the output 80 of the Y-sweep circuit 74 to the Y-deflection winding 42Y, determining a character display position (X-Y coordinates) in response to a control or timing signal from the control 60. The voltages fed to the X-deflection winding 42X and the Y-deflection winding 42Y are controlled such that the X-ray microbeam 30a–30b displays a character pattern on the area 26 on the panel 18 in accordance with a character pattern generated by the character pattern generator 62.

The X-ray microbeam 30a–30b is directed to and sweeps the area 26 on the panel 18 in response to the signals representative of the character pattern generated by the character pattern generator 62, thereby storing into area 26 the data entered through the keyboard 50 or like data input unit. For the X-ray microbeam 30a–30b to be directed to and moved over the area 26 to display character patterns, any suitable known technique may be employed such as the TV raster scanning, dot display using strip raster scanning, or stroke (vector) display.

To summarize, various data such as object data entered through the keyboard 50 or the like are temporarily stored in the control 60, the intensity modulator 70, X-sweeper 72 and Y-sweeper 74 control the intensity and sweeping of the electron beam 36 under the control of the control 60 and in response to a character pattern signal generated by the character pattern generator 62, so that the microbeam 30a–30b scans the area 26 on the panel 18 to store or record the data therein.

Figure 3:
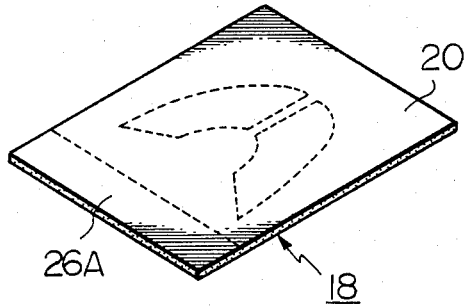

The character patterns generated by the character pattern generator 62 are not limited to those which can be spelled out, but may take the form of bar codes which can be read by machines. While in FIG. 1 the data recording area 26 is located in a lower portion of the surface 24 of the panel 18 opposite to the surface 20, it may be defined in a portion of the image storing surface 20 as at 26A as shown in FIG. 3. In such a case, both X-ray source 12 and X-ray microbeam generation unit 28 may be located on one side with respect to the panel 18 with the X-ray shield layer 22 replaced by, for example, a movable shield plate (not shown) mounted on an exposure station (not shown) which may be loaded with a panel 18 so as to shield the recording area 26A from the X-rays 14 and 16 during exposure of the object. When information is recorded on the area 26A, the shield plate will be temporarily removed by suitable drive means.

In summary, it will be seen that the present invention provides a recording system which permits various kinds of information necessary for the management of radiation image storage panels and image processing to be reproduced and displayed directly and simultaneously with the read-out of a radiation image which has been stored in a radiation image storage panel for the purpose of observation or analysis. It will also be seen that the system in accordance with the present invention eliminates the need for furnishing radiation image storage panels or cassettes for them with a magnetic recording medium, a label indicating a panel identification code or like medium for recording such information.

Various modifications will become possible for those skilled in the art after receiving the teachings of the present disclosure without departing from the scope thereof.

What is claimed is:

1. A data recording system wherein a radiation image storage medium including a stimulable phosphor is exposed to a radiation transmitted through an object to store therein a latent image associated with the object, said medium being, afterwards, exposed to a stimulating ray to read out the stored latent image, comprising:
    X-ray beam generator means for generating an X-ray beam to a part of the radiation image storage medium;
    input means for receiving information associated with an image to be stored in the part of the radiation image storage medium; and
    control means connected to said X-ray generator means and input means for controlling the X-ray beam generator means in accordance with the received information;
    said control means varying the intensity of the X-ray beam in accordance with the received information, and causing the X-ray beam to be directed to the part of the radiation image storage medium, thereby recording the received information in the part of the radiation image storage medium.

2. A system in accordance with claim 1, wherein said control means comprises a pattern generator circuit for generating a signal representative of a display pattern associated with the received information, an intensity varying circuit operative in response to the signal for causing said X-ray beam generator means to vary the intensity of the X-ray beam, and a beam moving circuit operative in response to the signal for causing said X-ray beam generator means to move the X-ray beam in position over the part of the storage medium.

3. A system in accordance with claim 2, wherein said beam moving circuit is adapted to cause said X-ray beam generator means to scan the part of the radiation image storage medium with the X-ray beam in a raster scanning fashion.

4. A system in accordance with claim 1, wherein said input means comprises keyboard means for manually entering the information into said system.

5. A system in accordance with claim 1, wherein said input means comprises an input port for receiving an input signal representative of the information from an external system.

6. A system in accordance with claim 1, wherein said input means comprises reader means for reading the information into said system from a medium having the information recorded thereon.

7. A data recording system wherein a radiation image storage panel including a stimulable phosphor is exposed to a radiation transmitted through an object to store therein a latent image associated with the object, said panel being, afterwards, exposed to a stimulating ray to read out the stored latent image, comprising:

X-ray generator means for generating and directing an X-ray beam to a part of the radiation image storage panel;

input means for receiving data associated with an image to be recorded on the part of the storage panel;

character pattern generator means connected to said input means for generating a signal representative of a display pattern indicating the received data;

intensity control means connected to said character pattern generator means for controlling said X-ray generator means to vary the intensity of the X-ray beam in accordance with the signal; and beam scanning means connected to said character pattern generator means for causing said X-ray beam generator means to scan the part of the storage panel with the X-ray beam in a raster scanning fashion in accordance with the received data, whereby the received data is recorded on the part of the radiation image storage panel.

8. A system in accordance with claim 7, wherein said input means comprises keyboard means for entering data including object and exposure data associated with the stored latent image into said system by manual operation.

9. A system in accordance with claim 7, wherein said input means comprises an input port to be connected to a radiation exposure system for receiving an input signal representative of data including exposure and imaging data associated with the stored latent image.

10. A system in accordance with claim 7, wherein said input means comprises reader means for reading into said system data including object and exposure data associated with the stored latent image from a recording medium having the data recorded thereon.

11. A data recording system wherein a radiation image storage panel including a stimulable phosphor is exposed to a radiation transmitted through an object to store therein latent image associated with the object, said panel being, afterwards, exposed to a stimulating ray to read out the stored latent image, comprising:

X-ray generator means for generating and directing an X-ray beam to a part of the radiation image storage panel;

keyboard means for entering data including object and exposure data associated with the stored latent image into said system by manual operation;

reader means for reading into said system data including object and exposure data associated with the stored latent image from a recording medium having the data recorded thereon;

an input port to be connected to a radiation exposure system for receiving an input signal representative of data including exposure and imaging data associated with the stored latent image;

memory means connected to said keyboard and reader means, and said input port for storing the data therein; and control means connected to said X-ray generator means and memory means for controlling said X-ray beam generator means in accordance with the data;

said control means varying the intensity of the X-ray beam in accordance with the data, and causing the X-ray beam to scan the part of the storage panel in a raster scanning fashion, thereby recording the data on the part of the storage panel as a latent image.

* * * * *